United States Patent Office 2,820,729
Patented Jan. 21, 1958

2,820,729

REMOVAL OF SCALE FROM FERROUS METALS

Benjamin F. Davis, Jr., Houston, Tex., and Paul H. Cardwell, Midland, Mich., assignors to The Dow Chemical Company, Midland, Mich., a corporation of Delaware No Drawing. Application August 4, 1955
Serial No. 526,548

7 Claims. (Cl. 134—42)

This invention concerns an improved method for removing, from ferrous metals, scales comprising rust and/or other corrosion products, e. g. oxides or hydroxides of the metals. It pertains especially to the removal of such scales from inner surfaces of boilers, heat-exchangers, and pipes, etc., for generating or handling steam at high pressures.

Such iron or steel equipment for the generation or handling of high pressure steam, i. e. steam at a pressure of 400 p. s. i. g. or above, undergoes corrosion and often becomes coated on the inside with a scale rich in oxides or hydroxides of the metal or metals present. The rate of formation or accumulation of the scale is dependent, of course, on the kind of ferrous metal employed and such equipment is often constructed of, or lined on the inside with, corrosion-resistant alloy steels such as the so-called stainless steels comprising iron alloyed with lesser amounts by weight of nickel and/or chromium. However, the scale tends to form or accumulate in the equipment regardless of the kind of ferrous metal employed, i. e. regardless of whether inner walls of the equipment are constructed of ordinary iron, or carbon steel, or of a corrosion-resistant alloy steel. For efficient operation of the equipment it is important that the scale periodically be removed.

As indicated above, the scale formed in high pressure steam equipment usually consists for the most part, on a weight basis, of oxides or hydroxides of the metal or metals present. The scale may, and sometimes does, include other solid ingredients such as calcium sulfate, or sulfates or other salts of the metal or metals of which the equipment is constructed, but the other ingredients just mentioned are usually present in minor amounts. Although similar scales rich in rust, or in a mixture of oxides and/or hydroxides of iron and other heavy metals such as nickel, chromium, or molybdenum, etc., often are formed on the surfaces of ferrous metals in ways other than by contact with high pressure steam, and the method of the invention is applicable in removing such a scale regardless of how it was formed, the scales just mentioned are different from the scales rich in calcium and magnesium sulfates, carbonates or other metal salts, but often comprising minor amounts by weight of rust, which are deposited from water in pipe lines and on the inner surfaces of household water heaters or on the inner surfaces of boilers for the generation of steam at pressures lower than 400 p. s. i. g. The last mentioned scales, rich in metal salts are not as readily removed from metal surfaces by the method of the present invention as are the scales rich in heavy metal oxides and hydroxides, e. g. rust, that are formed inside high pressure steam equipment.

Several methods for removing scales from iron or steel surfaces are known and are commonly used. Mechanical removal of the scale is disadvantageous in that it requires disassembly and reassembly of the boilers or other metal equipment. Inhibited aqueous acid solutions can be employed for removal of the scales, rich in metal oxides or hydroxides, from iron or steel surfaces, but usually result in a small, but appreciable, amount of corrosion of the iron or steel parts from which the scale is removed. Since the extent and distribution of the corrosion occurring during such removal of scale from the plates and tubes of a boiler or heat exchanger cannot readily be determined, repeated use of inhibited acids for the removal of scale from equipment for the handling of steam at high pressures is not desirable. It has been proposed to remove scales comprising metal oxides or hydroxides from inner surfaces of boilers or similar equipment by circulating an aqueous slurry of granules or particles of an ion exchange material, e. g. sodium zeolite, through the equipment. In tests of this method, it has been found that usual ion exchange materials, such as the sodium form of a sulfonated ion exchange resin, which ion exchange materials are in the form of hard particles or granules soaked with water, react very sluggishly to loosen and remove the scale. Also, care is required to avoid formation inside of the boiler or other equipment of deposits of the insoluble ion exchange material. Such deposits of ion exchange material, if permitted to form in the equipment, may be as objectionable as the scale that is to be removed.

It has now been found that alkali metal salts of sulfonated resins which are capable of being highly swollen to fragile jell-like bodies that are readily broken into small soft particles by moderate agitation or stirring in water are effective in loosening and removing the aforementioned scale rich in oxides or hydroxides of heavy metals, especially of iron, from the surfaces of ferrous metals and that they have little, if any, corrosive action toward the metals, i. e. their corrosive action, if any, is of about the same order as that of water alone. These soft, fragile, highly water-swollen alkali metal resin sulfonates tend to remain dispersed or suspended in aqueous media and render the suspensions far more viscous than water alone. They react more rapidly to chemically absorb metal irons from the aforementioned scales than do either the hard granules of conventional cation exchange resins in alkali metal salt form or the alkali metal resin sulfonates that can be dissolved or dispersed in water without causing a tremendous increase in viscosity of the resulting composition over that of water alone. In fact, the effectiveness of alkali metal resin sulfonates in reacting with and loosening the scale appears to be dependent principally upon the extent to which the resin sulfonates are swollen by and thicken water when added to and stirred with the water and to a lesser extent upon the identity of the sulfonated resin itself. For instance, in tests of a series of lithium salts of sulfonated vinyl aromatic resins, i. e. sulfonated polymers or copolymers of styrene, it was found that the resin sulfonates which were most effective in removing the aforementioned scale from steel surfaces were salts of resin sulfonic acids which, when stirred with water to form aqueous dispersions containing 0.5 weight percent of the respective resins, formed such dispersions having viscosities of from 100 to 400° centipoises at 25° C. The lithium salts of resin sulfonic acids having this range of thickening effects toward water were far more effective in removing the scale from steel surfaces than were lithium salts of resin sulfonic acids that had lesser or greater effects than just stated in thickening water.

The above-stated range of viscosity values was determined for aqueous dispersions of the resin sulfonic acids rather than the alkali metal salts thereof. However, the alkali metal, e. g. the sodium, potassium, or lithium, salts of the resin sulfonic acids are dispersible in water and possess thickening effects for the water which do not differ greatly from those of the corresponding resin sulfonic acids.

It has also been found that other alkali metal resin sulfonates, e. g. sodium, potassium, or lithium salts of sulfonated vinyl aromatic resins such as polystyrene, copolymers of styrene and vinyltoluene, and copolymers of styrene and acrylonitrile, etc., were most effective for removal of the scale when they were salts of resin sulfonic acids having the above range of thickening effects in increasing the viscosity of water and that such salts of corresponding resin sulfonic acids having lesser or greater thickening actions toward water were less effective, or noneffective, in removing such scale.

It was further found that alkali metal salts of other kinds of resin sulfonic acids that similarly are highly swellable by water to form soft, fragile gels and that can be dispersed by stirring in water to thicken the latter are also effective in reacting with and removing the scale. For instance, alkali metal salts of highly water-swellable sulfonated phenol-formaldehyde resins are effective for removal of the scale from ferrous metals.

From these results it is evident that it is the physical properties, especially the relative thickening actions toward water, of the alkali metal resin sulfonates which determine for the most part the effectiveness of alkali metal resin sulfonates for removing the scale and that any alkali metal salt of a resin sulfonic acid having the above-described thickening action toward water can satisfactorily be used. The identity of the alkali metal resin sulfonate appears to be less important than its thickening action toward water in determining its effectiveness for the scale removal.

The highly swellable alkali metal resin sulfonates which are satisfactorily effective in removing the scale from ferrous metals have very little, if any, corrosive action toward the metals themselves, i. e. the slight amount of corrosion which occurs during treatment of a ferrous metal with an aqueous dispersion of such alkali metal resin sulfonate is about the same as results from an otherwise similar treatment of the metal with water alone. Accordingly, the highly swellable alkali metal resin sulfonates can be employed to remove the scale from iron or steel surfaces without causing appreciable corrosion of the metal itself. This is of importance in removing scale deposits from boilers or other metal equipment for generating or handling steam at high pressures.

It has further been found that highly swellable resin sulfonic acids having the above-stated range of thickening actions toward water are not, of themselves, rapidly corrosive toward ferrous metals and that they are more rapidly reactive with the scale to loosen and remove the latter from the surface of a ferrous metal than are the corresponding alkali metal resin sulfonates. Their failure to cause rapid corrosion of the iron or steel is, presumably, due to the fact that although they are highly absorptive of water and are readily dispersible, e. g. as colloidal or larger particles, in aqueous media, they are not truly soluble in water. However, the invention is not restricted by this or any other theory in explanation of the results obtained. Since the resin sulfonic acids are strongly acidic, they are not as conveniently stored, shipped or handled as are the alkali metal salts thereof. The rapid scale-removing activity and substantially non-corrosive action toward ferrous metals of the highly swellable resin sulfonic acids may be obtained by employing, for the scale removal, an aqueous dispersion of the highly swellable alkali metal resin sulfonate and during its use gradually adding, with stirring or other agitation, a strong mineral acid such as hydrochloric or sulfuric acid at a rate such as to maintain the slurry at pH values between 2 and 7, preferably between 2.5 and 4.5, e. g. at a rate such that a considerable amount of the resin sulfonate remains in the form of metal salts thereof.

Resin sulfonates having the above-described necessary properties of being highly swellable by water to the form of soft, fragile gels and of being dispersible by stirring in water to thicken the latter, and methods of making the same, are known to the art. However, many of the well-known resin sulfonates do not possess said properties. For instance the sulfonated phenol-formaldehyde resins and the sulfonated copolymers of styrene with ethylvinylbenzene and divinylbenzene which are well known for use as cation exchange resins are insoluble in, and only moderately swollen by, water, and both before and after being soaked with water are in the form of hard granules or particles which have very little, if any, effect in thickening, i. e. increasing the viscosity of, a body of water in which they are immersed. However, phenol sulfonic acid and formaldehyde can be chemically condensed with one another under the action of acidic condensation catalysts to form resinous condensation products which are highly swellable to soft gels by water, are dispersible in water to thicken the latter, and which in their acid form, or preferably in the form of alkali salts thereof, can be used to remove scale from ferrous metals in accordance with the method of the invention. Polystyrene, or other vinyl aromatic resins, can be sulfonated to form water-insoluble sulfonates that are not highly swellable by, or readily dispersible in, water and are not suitable for use in the present method; or they can be sulfonated under conditions such as to obtain highly swellable resin sulfonates which are dispersible by stirring in water to thicken the latter and are well adapted for use in removing scale from ferrous metals by the method of the invention; or they can in some instances be sulfonated under other conditions such that the sulfonated resin products are truly water-soluble, have only a moderate effect of thickening water in which they are dissolved and are not satisfactory for use in the method of the invention. Sulfonated vinyl aromatic resins having the necessary properties of being highly swellable to soft gels by water, and dispersible in water to thicken the latter, are most readily obtainable by feeding into admixture with one another a stream of chlorosulfonic acid, preferably diluted with an equal volume or more of a liquid polychlorinated lower aliphatic hydrocarbon such as carbon tetrachloride, tetrachloroethylene, methylene chloride, or ethylene chloride, and a dilute, e. g. 3 weight percent or less, solution of the unsulfonated vinyl aromatic resin in such liquid polychlorinated aliphatic hydrocarbon at rates such as to bring the chlorosulfonic acid and the resin together in proportions of at least 0.6, preferably from 0.8 to 2, molecular equivalents of the chlorosulfonic acid per molecular equivalent of monovinyl aromatic compound chemically combined in the resin, while maintaining the resulting mixture at reaction temperature not higher than 35° C. and preferably from —15° to 30° C. Other usual sulfonating agents such as concentrated sulfuric acid, fuming sulfuric acid, or sulfur trioxide can be used in place of chlorosulfonic acid to obtain suitable resin sulfonates, but chlorosulfonic acid has been more convenient and satisfactory than other sulfonating agents for use in sulfonating vinyl aromatic resins to make vinyl aromatic resin sulfonates having the aforementioned properties which are required for use in the scale-removal method of the invention.

Although any resin sulfonate which is highly swellable by water to form a soft, fragile gel and which has the hereinbefore-described thickening action toward water can be used in practice of the invention, sulfonates of thermoplastic vinyl aromatic resins having such properties are preferred. Examples of vinyl aromatic resins which may be sulfonated as described above to obtain suitable sulfonates are the solid thermoplastic polymers of styrene, vinyltoluene, and vinylxylene; the copolymers of the compounds just named with one another; and the thermoplastic copolymers of a major amount by weight of one or more of said compounds with minor amounts of other polymerizable vinylidene compounds such as acrylonitrile, or isobutylene; etc.

In applying the invention for the removal of scale from the inner surfaces of a high pressure steam boiler, one or more of the highly water-swellable resin sulfonates effective as thickening agents for aqueous liquids, usually a highly water-swellable alkali metal resin sulfonate, and preferably a lithium resin sulfonate, is stirred together with water to form an aqueous dispersion thereof. The resin sulfonate dispersion is more viscous than water and its viscosity varies in accordance with the concentration thereof. It should be sufficiently dilute to permit pumping the same. In most instances, it contains from 0.1 to 2 percent by weight of the resin sulfonate, but it may be of concentrations lower or higher than just stated. The highly swollen soft resin sulfonated may be dispersed as colloidal particles or may be suspended in the water as larger particles. The resulting dispersion is circulated, e. g. by means of a pump, through the boiler. If desired, a strong mineral acid such as hydrochloric or sulfuric acid may gradually be fed into admixture with the circulating aqueous mixture at a rate such as to maintain the mixture at pH values of from 2 to 7, preferably from 2.5 to 4.5. The addition of a mineral acid speeds up the rate of removal of the scale from the boiler and can be accomplished without causing appreciable corrosion of the metal parts of the boiler. However, in order to avoid corrosion, the mineral acid should not be added in amount or at a rate exceeding that required for liberation of all of the resin sulfonic acid from its metal salts and the added acid should quickly and thoroughly be stirred into the aqueous dispersion. Addition of a mineral acid to the alkali metal resin sulfonate dispersion is not required for removal of the scale from the boiler, i. e. the aqueous alkali metal resin sulfonate dispersion, although less rapidly reactive, is of itself effective for the purpose.

The scale removal may be accomplished by circulating the aqueous resin sulfonate solution through the boiler at room temperature, but takes place more rapidly at elevated temperatures. The resin sulfonate dispersion is usually heated, e. g. to above room temperature and usually to temperatures in the order of from 100° to 250° F. or above while being circulated through the boiler. The scale removal operation can usually be carried out in a few, e. g. from 2 to 10 hours, but in instances in which a heavy scale deposit is to be removed, longer times may be required. After loosening or removing the scale in the manner just described, the boiler is usually flushed with a vigorous flow of water. It is then ready to be returned to service.

The method, as just described, can be applied in removing scales rich in rust or other metal oxides or hydroxides from other kinds of iron or steel equipment, e. g. from heat exchangers or pipe lines, etc.

The following examples describe ways for practice of the invention and illustrate certain of its advantages, but are not to be construed as limiting the invention.

EXAMPLE 1

Lithium salts of several vinyl aromatic resin sulfonic acids, named and characterized in the following table, were tested for effectiveness in removing iron oxide deposits or coatings from stainless steel test pieces. The resin sulfonic acids are characterized by the respective "½ percent viscosity" values which are given, each of which values is the viscosity in centipoises at 25° C. of an aqueous dispersion or mixture formed by stirring one part by weight of a resin sulfonic acid in 199 parts of water. Portions of the respective solid resin sulfonic acids were dispersed in separate portions of water, each dispersion was brought to a pH value of 7 by neutralization with lithium hydroxide, and the resulting lithium resin sulfonate dispersions were brought, e. g. by dilution with water, to the respective concentrations given in the table. The lithium resin sulfonate dispersions thus formed were individually tested for effectiveness in removing an iron oxide scale from a stainless steel test piece. Each such test piece was formed by spreading an aqueous paste of powdered $Fe_3O_4$ over a face of a test piece composed of a stainless steel comprising iron as the principal ingredient alloyed with about 18 percent by weight of nickel and 8 percent of chromium and baking the coated piece at a temperature of 250° F. for 6 hours to form a scale of 1/64 inch thickness thereon. In each experiment, such metal test piece having the scale thereon was immersed in a stream of one of the aqueous lithium resin sulfonate dispersions, which stream was heated at 175° F. and circulated over the test piece at a linear flow rate of 7.8 centimeters per second. In some, but not all, of the experiments the aqueous resin sulfonate dispersion attacked, loosened and removed a considerable amount of the scale. A large part of the iron oxide thus removed was in the form of a dispersion, presumably of the iron resin sulfonate, in the circulating liquor. The test piece was immersed in the circulating stream of the resin sulfonate dispersion for 2 hours and then removed. It was then inspected and the percent of the scale, initially present thereon, which had been removed was estimated. The rates at which stainless steel of the above-mentioned composition becomes corroded by hot water alone and by fresh heated aqueous lithium resin sulfonate dispersions of the kinds and concentrations employed in the above-described experiments were determined as follows. An uncoated plate of the stainless steel was weighed, then immersed in the liquid which was heated at 175° F. and circulated over the test plate for 16 hours. The metal plate was then removed, dried, and weighed. The corrosion rate, expressed as pounds of metal lost by corrosion per square foot of initial metal surface per 24 hours, was calculated from the data thus-collected and is given in the table. The table identifies, and gives the "½ percent viscosity" value of, each resin sulfonic acid. It gives the percent by weight of the corresponding lithium resin sulfonate in the aqueous dispersions thereof which were tested for scale removal. It also gives the percent of the scale initially present which is estimated to have been removed in each scale removal experiment.

Table I

| Test No. | Resin sulfonate | | Scale removal and corrosion tests | | |
|---|---|---|---|---|---|
| | Kind, i. e. a sulfonate of— | ½ percent viscosity of its acid form | Percent of Li resin sulfonate in dispersion tested | Percent of scale removed | Corrosion rate, lbs./sq. ft./day |
| 1 | Polymer of vinyltoluene | 100 | 0.5 | 25 | Not determined. |
| 2 | Polystyrene | 100 | 0.5 | 25 | 0.000007. |
| 3 | Copolymer of 50 wt. percent styrene and 50 percent vinyltoluene | 1,000 | 0.25 | 75 | 0.000076. |
| 4 | Polystyrene | 4,000 | 0.125 | 33 | 0.000079. |
| 5 | ....do.... | 44,000 | 0.5 | 0 | 0.000025. |
| 6 | None | | None; i. e. corrosion test using water as the liquid. | | 0.000045. |

The corrosion rates in the table indicate that the aqueous lithium resin sulfonated dispersions were not greatly more corrosive, and in some instances were less corrosive, than water alone toward the metal. The table indicates that the lithium salts of resin sulfonic acids having "½ percent viscosity" values between 100 and 4,000 centipoises are the most effective in removing the scale and that the effectiveness of scale removal decreases as the "½ percent viscosity" values of the corresponding resin sulfonic acids approach or reach the limiting values just stated.

EXAMPLE 2

A number of other resin sulfonates were tested for effectiveness in removing an iron oxide scale from plates of stainless steel. Except for the kinds of resin sulfonates employed, the procedure in carrying out the tests was similar to that described in Example 1. Table II identifies each resin sulfonate and gives the weight percent concentration of the same in the aqueous dispersion thereof. The table gives the "½ percent viscosity" value for the corresponding resin sulfonic acid and gives the percent of scale which is estimated to have been removed from the test plate by action of the aqueous resin sulfonate dispersion. In some instances the "½ percent viscosity" values of the resin sulfonic acids in water were not determined directly, but were estimated on a basis of viscosities measured for aqueous dispersions of the resin sulfonic acids in other than ½ percent concentrations. The table indicates which of said values are estimated. The estimated values may involve fairly large numerical errors, but are believed to be of sufficient accuracy for the present purpose.

*Table II*

| Test No. | Resin sulfonate | | Scale removal test | | |
|---|---|---|---|---|---|
| | Sulfonate of— | ½ percent of viscosity of acid form | Salt of the resin sulfonic acid | | Percent of scale removed |
| | | | Kind of salt | Percent conc. | |
| 1 | Polystyrene | 5–20 | Na salt | 0.5 | 0 |
| 2 | do | 150 | do | 0.5 | 5 |
| 3 | do | ¹ 400 | do | 0.17 | 10 |
| 4 | Copolymer of styrene and smaller am't of acrylonitrile. | 1,360 | Li salt | 0.09 | 25 |
| 5 | Polystyrene | ¹ 3,000 | Na salt | 0.07 | 33 |
| 6 | Copolymer of about 99.8 wt. percent vinyltoluene, 0.1 percent ethylvinylbenzene and 0.1 percent divinylbenzene. | ¹ 4,000 | Li salt | 0.2 | 10 |

¹ Estimated.

EXAMPLE 3

This example illustrates the effect of adding a mineral acid to an aqueous dispersion of a highly water-swellable alkali metal resin sulfonate dispersion during use of the latter for removal of scale from the surface if a ferrous metal. In each of several experiments there was employed a test plate of a stainless steel comprising iron as the principal ingredient alloyed with about 18 weight percent of nickel and 8 percent of chromium, which test plate had on one of the faces thereof a tightly adhering scale having a composition different from that of the scale on the test plates which were used in the experiments of Examples 1 and 2. The test plates which were employed in the present experiments were each prepared by coating one face of a stainless steel plate with an aqueous paste of a powdered mixture of 40 weight percent $Fe_3O_4$, 15 percent of $Fe_2O_3$, 25 percent of $SiO_2$ and 20 percent of $Cr_2O_7$ and baking the coated plate by treating it in an over at 250° C. for 6 hours. The layer of scale thus formed over one face of the plate was of 1/64 inch thickness.

In each experiment such coated plate was immersed in a stream of a liquid which was heated at a temperature of 175° F. and was circulated over the coated face of the plate at a linear flow rate of 7.8 centimeters per second. The composition of the liquid was changed at least to some extent from one experiment to another. In one of the experiments, water alone was the heated liquid which was circulated over a test plate. In another experiment the liquid was an aqueous dispersion of a lithium resin sulfonate in 0.25 weight percent concentration which lithium resin sulfonate was similar in kind to that employed in run 3 of the Table I. In another of the experiments a similar lithium resin sulfonate dispersion was employed except that it initially was given a single treatment with sufficient sulfuric acid to bring it to a pH value of 2.5. During the first 1 hour of circulation of this initially acidified dispersion over a coated test plate its pH value rose to 5. In another of the experiments a similar lithium resin sulfonate dispersion was initially employed, but during circulation of the heated dispersion, over a test plate having the scale deposit thereon, sulfuric acid was added as necessary to maintain the dispersion at a pH value of 2.5. In each of the experiments, the test plate, initially bearing the scale, was immersed in the liquid stream for the time indicated in Table III. It was then removed and examined. From the examination the percent of the scale, initially present on the test plate, which had been removed by the treatment was estimated. Table III indicates which of the above-described liquids or procedures was used in the respective experiments and gives the time of immersion of a test plate in the liquid. The table also gives the percent of the scale which is estimated to have been removed from a test plate in each experiment.

*Table III*

| Run No. | Identification of liquid tested | Time of immersion, hrs. | Percent of scale removed |
|---|---|---|---|
| 1 | $H_2O$ | 2 | 3 |
| 2 | Li resin sulfonate dispersion having pH of 7 | 3 | 20 |
| 3 | Li resin sulfonate dispersion initially brought to pH of 2.5, but pH rose to 5 in 1st hour of test. | 2½ | 25 |
| 4 | Li resin sulfonate dispersion maintained at pH of 2.5 throughout test. | 6 | 65 |

In a further experiment, an uncoated test plate, of known weight and dimensions and of the kind employed in the experiments of Table III, was immersed in a stream of liquid, initially consisting of the 0.25 percent lithium resin sulfonate dispersion, for a measured period of time. Throughout said period, sulfuric acid was added as necessary to maintain the dispersion at a pH value of 2.5 and the dispersion was heated to 175° F. and circulated at the rate stated above. The plate was then removed from the liquid, dried, and weighed to determine the amount of metal lost by corrosion. From the data thus obtained, the rate of corrosion of the metal plate by the aqueous dispersion under the conditions just stated was calculated to be 0.000065 pound per square foot of initial surface area per 24 hours.

EXAMPLE 4

This example illustrates use of an aqueous dispersion of a lithium salt of a highly water-swellable phenolformaldehyde resin sulfonic acid in practice of the invention. The lithium resin sulfonate dispersion was prepared in the following manner. A mixture of 200 grams of phenol and 300 grams of sulfuric acid of 98 percent concentration was prepared, and maintained for 2 hours, at a temperature of approximately 35° F. The mixture was then brought to a temperature of 80° F. and was stirred and maintained at about 80° F. for 22 hours. The mixture was next neutralized to a pH value of 7 by treatment with an aqueous calcium hydroxide suspension. The calcium sulfate which was thereby formed and precipitated was removed by filtration, washed with water, and the washings were added to the filtrate. The latter was then evaporated under vacuum at a temperature of about 120° F. until the residual solution contained about 50 percent by weight of water. Lithium sulfate was added to the residual solution in amount sufficient to precipitate remaining calcium ions as calcium sulfate and to convert the sulfonated phenol product to its lithium salt. The precipitated calcium sulfate was removed by filtration and the filtrate was evaporated to obtain the lithium phenol sulfonate as a solid residue which was dried in an oven at 200° F. A portion of the lithium phenol sulfonate was dissolved in an aqueous formaldehyde solution of 37 weight percent concentration to form a solution containing equimolecular amounts of the lithium phenol sulfonate and formaldehyde. To the resulting solution there was added, as a condensation catalyst, an aqueous sulfuric acid solution (formed by diluting one part by volume of 98 percent sulfuric acid with 10 parts of water) in amount containing 0.32 molecular equivalent of sulfuric acid per mole of the formaldehyde. The mixture thus formed was heated at 180° F. until it had thickened to an extremely viscous, barely flowable body, i. e. until on turning the reaction vessel on its side the resin meniscus shifted only slightly in 10 seconds. The mixture was then cooled and diluted with water to form an aqueous dispersion containing 10 percent by weight of the resinous product. This dispersion was neutralized with lithium hydroxide to a pH value of from 5 to 6. A portion of the aqueous lithium resin sulfonate dispersion thus formed was diluted with a further amount of water to a point at which it contained 5 percent by weight of the resin sulfonate. The 5 percent resin sulfonate dispersion was far more viscous than water, but, was readily flowable. It was tested to determine its effectiveness in removing an iron oxide scale deposit from the surface of a stainless steel plate. Except for the kind and concentration of the resin sulfonate dispersion employed, the procedure in carrying out this experiment on the removal of scale was similar to that employed in the experiments on scale removal which are described in Example 1. Approximately 50 percent of the scale initially present on the stainless steel test plate was removed by the treatment with the aqueous lithium phenol-formaldehyde resin sulfonate dispersion.

We claim:

1. A method for the removal of a scale, rich in oxides or hydroxides of ferrous metals, from the surface of a ferrous metal, which method comprises contacting the scale with a stream of a flowable liquid aqueous dispersion of a resin sulfonate, which aqueous dispersion has a pH value of from about 2 to about 7, and which resin sulfonate initially comprises an alkali metal salt of a resin sulfonic acid that is highly swellable by water to the form of a soft, fragile gel and is dispersible by stirring together with water and forms with water an aqueous dispersion that, when of 0.5 weight percent concentration, has a viscosity of from about 100 to about 4,000 centipoises at 25° C., whereby scale is removed from the metal and is dispersed in the liquid, and thereafter removing the ferrous metal and the aqueous resin sulfonate dispersion out of contact with one another.

2. A method, as claimed in claim 1, wherein a deposit of the scale is removed from surfaces of stainless steel equipment by contacting the scale with a stream of a flowable liquid aqueous dispersion of an alkali metal salt of a vinyl aromatic resin sulfonic acid, which aqueous dispersion has a pH value of from about 2 to about 7, and which vinyl aromatic resin sulfonic acid is highly swellable by water to the form of a soft, fragile gel and is dispersible by stirring in water and forms with water an aqueous dispersion which, when of 0.5 weight percent concentration, has a viscosity of from 100 to 4000 centipoises at 25° C., and heating the stream of the aqueous resin sulfonate dispersion at temperatures between 100° and 250° F. while in contact with the scale, maintaining the equipment in contact with the stream of the liquid resin sulfonate dispersion until a substantial portion of the scale has been removed from the equipment, and thereafter removing the aqueous dispersion, comprising removed scale, from contact with the equipment.

3. A method, as claimed in claim 2, wherein the scale is one rich in iron oxide and the aqueous dispersion is a dispersion of a lithium salt of the vinyl aromatic sulfonic acid in water.

4. A method, as claimed in claim 2, wherein the scale is one rich in iron oxide and the aqueous dispersion is a dispersion of a sodium salt of the vinyl aromatic resin sulfonic acid in water.

5. A method, as claimed in claim 1, wherein a deposit of the scale is removed from surfaces of stainless steel equipment by contacting the scale with a stream of an aqueous dispersion of the resin sulfonate in the form of an alkali metal salt thereof, and during such contact adding a mineral acid to the dispersion in amount such as to bring the dispersion to pH values below 7 and above 2, whereby scale is removed from the equipment and becomes dispersed in the stream of liquid, and thereafter removing the aqueous dispersion, comprising removed scale, from contact with the equipment.

6. A method for the removal of a scale, rich in oxides or hydroxides of ferrous metals, from the surface of a stainless steel, which method comprises contacting the scale with a stream of a liquid aqueous dispersion of a lithium salt of a vinyl aromatic resin sulfonic acid, which vinyl aromatic resin sulfonic acid is highly swellable by water to form a soft, fragile gel and can be dispersed by stirring in water to form an aqueous dispersion of 0.5 weight percent concentration having a viscosity of between 100 and 4,000 centipoises at 25° C., and during such contact adding a mineral acid to the dispersion in amount such as to bring the dispersion to pH values below 7 and above 2, whereby scale is removed from the equipment and becomes dispersed in the stream of liquid, and thereafter removing the aqueous dispersion, comprising removed scale, from contact with the equipment.

7. A method for the removal of a scale, rich in oxides or hydroxides of ferrous metals, from the surface of a stainless steel, which method comprises contacting the scale with a stream of a liquid aqueous dispersion of a sodium salt of a vinyl aromatic resin sulfonic acid, which vinyl aromatic resin sulfonic acid is highly swellable by water to form a soft, fragile gel and can be dispersed by stirring in water to form an aqueous dispersion of 0.5 weight percent concentration having a viscosity of between 100 and 4,000 centipoises at 25° C., and during such contact adding a mineral acid to the dispersion in amount such as to bring the dispersion to pH values below 7 and above 2, whereby scale is removed from the equipment and becomes dispersed in the stream of liquid, and thereafter removing the aqueous dispersion, comprising removed scale, from contact with the equipment.

References Cited in the file of this patent
UNITED STATES PATENTS 2,674,523    McDonald _____ Apr. 6, 1954